(12) United States Patent
Krumm

(10) Patent No.: US 9,846,049 B2
(45) Date of Patent: Dec. 19, 2017

(54) ROUTE PREDICTION

(75) Inventor: John Charles Krumm, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1323 days.

(21) Appl. No.: 12/170,068

(22) Filed: Jul. 9, 2008

(65) Prior Publication Data

US 2010/0010733 A1    Jan. 14, 2010

(51) Int. Cl.
  *G01C 22/00*    (2006.01)
  *G05D 1/00*    (2006.01)
  *G01C 21/34*    (2006.01)

(52) U.S. Cl.
  CPC .................. *G01C 21/3484* (2013.01)

(58) Field of Classification Search
  None
  See application file for complete search history.

(56) References Cited

U.S. PATENT DOCUMENTS

| | | |
|---|---|---|
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,812,865 A | 9/1998 | Theimer et al. |
| 5,948,040 A | 9/1999 | DeLorme et al. |
| 5,978,732 A | 11/1999 | Kakitani et al. |
| 6,084,543 A | 7/2000 | Iizuka |
| 6,092,014 A | 7/2000 | Okada |
| 6,122,572 A | 9/2000 | Yavnai |
| 6,154,745 A | 11/2000 | Kari et al. |
| 6,292,687 B1 | 9/2001 | Lowell et al. |
| 6,317,718 B1 | 11/2001 | Fano |
| 6,321,161 B1 | 11/2001 | Herbst et al. |
| 6,353,398 B1 | 3/2002 | Amin et al. |
| 6,418,424 B1 | 7/2002 | Hoffberg et al. |
| 6,466,232 B1 | 10/2002 | Newell et al. |
| 6,480,783 B1 | 11/2002 | Myr |
| 6,513,046 B1 | 1/2003 | Abbott, III et al. |

(Continued)

FOREIGN PATENT DOCUMENTS

| | | |
|---|---|---|
| DE | 10042983 A1 | 3/2002 |
| EP | 1085484 A2 | 3/2001 |

(Continued)

OTHER PUBLICATIONS

Froehlich and Krumm. "Route Prediction from Trip Observations, in Society of Automotive Engineers (SAE) World Congress." 2008, Paper Jan. 1, 2008 95: Detroit, Michigan USA.

(Continued)

*Primary Examiner* — Fateh M Obaid
(74) *Attorney, Agent, or Firm* — Schwegman Lundberg & Woessner, P.A.

(57) ABSTRACT

Driving history of a user with regard to a particular road intersection can be collected and retained in storage. A Markov model can be used to predict likelihood of the user making a particular decision regarding the intersection. A highest likelihood decision can be identified and used to create a travel route. In addition, contextual information can be taken into account when creating the route, such as time of day, road conditions, user situation, and the like.

16 Claims, 10 Drawing Sheets

(56) References Cited

U.S. PATENT DOCUMENTS

| | | | |
|---|---|---|---|
| 6,549,915 B2 | 4/2003 | Abbott, III et al. |
| 6,574,351 B1 | 6/2003 | Miyano |
| 6,611,754 B2 | 8/2003 | Klein |
| 6,615,130 B2 | 9/2003 | Myr |
| 6,618,593 B1 | 9/2003 | Drutman et al. |
| 6,672,506 B2 | 1/2004 | Swartz et al. |
| 6,700,504 B1 | 3/2004 | Aslandogan et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,889,382 B1 | 5/2005 | Anderson |
| 6,931,598 B2 | 8/2005 | Price et al. |
| 6,954,735 B1 | 10/2005 | Djupsjobacka et al. |
| 7,010,501 B1 | 3/2006 | Roslak et al. |
| 7,040,541 B2 | 5/2006 | Swartz et al. |
| 7,063,263 B2 | 6/2006 | Swartz et al. |
| 7,069,310 B1 | 6/2006 | Bartholomew |
| 7,071,842 B1 | 7/2006 | Brady, Jr. |
| 7,171,378 B2 | 1/2007 | Petrovich et al. |
| 7,195,157 B2 | 3/2007 | Swartz et al. |
| 7,200,566 B1 | 4/2007 | Moore et al. |
| 7,227,498 B2 | 6/2007 | Soliman |
| 7,233,861 B2 | 6/2007 | Van Buer et al. |
| 7,245,925 B2 | 7/2007 | Zellner |
| 7,246,007 B2 | 7/2007 | Ferman |
| 7,385,501 B2 | 6/2008 | Miller et al. |
| 7,386,477 B2 | 6/2008 | Fano |
| 7,403,774 B2 | 7/2008 | Chandra et al. |
| 7,536,258 B2 | 5/2009 | Kudo et al. |
| 7,577,522 B2 | 8/2009 | Rosenberg |
| 7,589,628 B1 | 9/2009 | Brady, Jr. |
| 7,596,513 B2 | 9/2009 | Fargo |
| 7,610,151 B2 | 10/2009 | Letchner et al. |
| 7,617,042 B2 * | 11/2009 | Horvitz et al. ............... 701/200 |
| 7,634,463 B1 | 12/2009 | Katragadda et al. |
| 7,676,583 B2 | 3/2010 | Eaton et al. |
| 7,720,715 B1 | 5/2010 | Nemer |
| 7,743,048 B2 | 6/2010 | Baldwin |
| 7,743,056 B2 | 6/2010 | Meisels et al. |
| 7,788,030 B2 | 8/2010 | Kato et al. |
| 7,797,267 B2 | 9/2010 | Horvitz |
| 7,813,870 B2 | 10/2010 | Downs et al. |
| 7,835,859 B2 | 11/2010 | Bill |
| 7,899,611 B2 | 3/2011 | Downs et al. |
| 7,912,637 B2 | 3/2011 | Horvitz et al. |
| 8,005,822 B2 | 8/2011 | Rechis et al. |
| 8,020,104 B2 | 9/2011 | Robarts et al. |
| 8,024,112 B2 | 9/2011 | Krumm et al. |
| 8,027,788 B2 | 9/2011 | Miyata |
| 8,131,467 B2 | 3/2012 | Yoshioka et al. |
| 2001/0029425 A1 | 10/2001 | Myr |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0002504 A1 | 1/2002 | Engel et al. |
| 2002/0032689 A1 | 3/2002 | Abbott, III et al. |
| 2002/0044152 A1 | 4/2002 | Abbott, III et al. |
| 2002/0052786 A1 | 5/2002 | Kim et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2003/0046401 A1 | 3/2003 | Abbott et al. |
| 2003/0154476 A1 | 8/2003 | Abbott, III et al. |
| 2003/0172368 A1 | 9/2003 | Alumbaugh et al. |
| 2003/0229471 A1 | 12/2003 | Guralnik et al. |
| 2003/0229895 A1 | 12/2003 | Jasinschi et al. |
| 2004/0017392 A1 | 1/2004 | Welch |
| 2004/0019603 A1 | 1/2004 | Haigh et al. |
| 2004/0068364 A1 | 4/2004 | Zhao et al. |
| 2004/0125144 A1 | 7/2004 | Yoon |
| 2004/0153445 A1 | 8/2004 | Horvitz et al. |
| 2004/0189475 A1 | 9/2004 | Cooper et al. |
| 2004/0201500 A1 | 10/2004 | Miller et al. |
| 2004/0267965 A1 | 12/2004 | Vasudevan et al. |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0091118 A1 | 4/2005 | Fano |
| 2005/0097005 A1 | 5/2005 | Fargo |
| 2005/0144318 A1 | 6/2005 | Chang |
| 2005/0182645 A1 | 8/2005 | Ehlis et al. |
| 2005/0216186 A1 | 9/2005 | Dorfman et al. |
| 2005/0219120 A1 | 10/2005 | Chang |
| 2005/0228553 A1 | 10/2005 | Tryon |
| 2005/0266858 A1 | 12/2005 | Miller et al. |
| 2005/0272442 A1 | 12/2005 | Miller et al. |
| 2006/0019676 A1 | 1/2006 | Miller et al. |
| 2006/0070012 A1 | 3/2006 | Milener et al. |
| 2006/0138219 A1 | 6/2006 | Brzezniak et al. |
| 2006/0146834 A1 | 7/2006 | Baker et al. |
| 2006/0195789 A1 | 8/2006 | Rogers et al. |
| 2006/0241862 A1 | 10/2006 | Ichihara et al. |
| 2006/0271286 A1 | 11/2006 | Rosenberg |
| 2007/0010942 A1 | 1/2007 | Bill |
| 2007/0033516 A1 | 2/2007 | Khosla et al. |
| 2007/0042790 A1 | 2/2007 | Mohi et al. |
| 2007/0060108 A1 | 3/2007 | East et al. |
| 2007/0073477 A1 | 3/2007 | Krumm et al. |
| 2007/0083497 A1 | 4/2007 | Martinez |
| 2007/0118279 A1 * | 5/2007 | Kudo ........................ 701/208 |
| 2007/0129072 A1 | 6/2007 | Yamato et al. |
| 2007/0156334 A1 | 7/2007 | Vu |
| 2007/0208991 A1 | 9/2007 | Rider |
| 2007/0219706 A1 | 9/2007 | Sheynblat |
| 2008/0004802 A1 * | 1/2008 | Horvitz ........................ 701/209 |
| 2008/0005055 A1 | 1/2008 | Horvitz |
| 2008/0016055 A1 | 1/2008 | Riise et al. |
| 2008/0021628 A1 | 1/2008 | Tryon |
| 2008/0027632 A1 | 1/2008 | Mauderer |
| 2008/0088424 A1 | 4/2008 | Imura et al. |
| 2008/0090591 A1 | 4/2008 | Miller et al. |
| 2008/0091537 A1 | 4/2008 | Miller et al. |
| 2008/0126191 A1 | 5/2008 | Schiavi |
| 2008/0140712 A1 | 6/2008 | Weber et al. |
| 2008/0161018 A1 | 7/2008 | Miller et al. |
| 2008/0243370 A1 | 10/2008 | Loera et al. |
| 2008/0247377 A1 | 10/2008 | Van Horn et al. |
| 2008/0261516 A1 | 10/2008 | Robinson |
| 2008/0263036 A1 | 10/2008 | Yamamoto |
| 2008/0268870 A1 | 10/2008 | Houri |
| 2008/0275632 A1 | 11/2008 | Cummings |
| 2008/0288494 A1 | 11/2008 | Brogger et al. |
| 2009/0003252 A1 | 1/2009 | Salomone et al. |
| 2009/0005067 A1 | 1/2009 | Ernst et al. |
| 2009/0006297 A1 * | 1/2009 | Horvitz et al. ................. 706/46 |
| 2009/0036148 A1 | 2/2009 | Yach |
| 2009/0037838 A1 | 2/2009 | Gedye et al. |
| 2009/0040954 A1 | 2/2009 | Usuba |
| 2009/0174540 A1 * | 7/2009 | Smith ........................ 340/465 |
| 2009/0319672 A1 | 12/2009 | Reisman |
| 2010/0036601 A1 | 2/2010 | Ozawa et al. |
| 2010/0070171 A1 | 3/2010 | Barbeau et al. |
| 2010/0082436 A1 | 4/2010 | Maghoul et al. |
| 2010/0106603 A1 | 4/2010 | Dey et al. |
| 2010/0188575 A1 | 7/2010 | Salomons et al. |
| 2010/0198860 A1 | 8/2010 | Burnett et al. |
| 2010/0248746 A1 | 9/2010 | Saavedra et al. |
| 2010/0305848 A1 | 12/2010 | Stallman |

(56) References Cited

U.S. PATENT DOCUMENTS

| | | | |
|---|---|---|---|
| 2010/0317374 | A1 | 12/2010 | Alpert et al. |
| 2010/0332315 | A1 | 12/2010 | Kamar et al. |
| 2010/0333137 | A1 | 12/2010 | Hamano et al. |
| 2011/0004513 | A1* | 1/2011 | Hoffberg ............... 705/14.1 |
| 2011/0075598 | A1 | 3/2011 | Jalfon et al. |
| 2011/0085447 | A1 | 4/2011 | Kholaif et al. |
| 2011/0150107 | A1 | 6/2011 | Jung et al. |
| 2011/0319094 | A1 | 12/2011 | Usui et al. |
| 2013/0077546 | A1 | 3/2013 | Liu et al. |
| 2013/0195091 | A1 | 8/2013 | Gibbs et al. |

FOREIGN PATENT DOCUMENTS

| | | |
|---|---|---|
| EP | 1929456 A1 | 6/2008 |
| EP | 2114103 | 11/2009 |
| EP | 2293016 | 3/2011 |
| JP | 2007083678 | 3/1995 |
| JP | 2008271277 | 10/1996 |
| JP | 10132593 | 5/1998 |
| JP | 2011153446 | 8/1999 |
| JP | 2002328035 | 11/2002 |
| JP | 2004317160 | 11/2004 |
| KR | 19970071404 | 11/1997 |
| KR | 20040033141 | 4/2004 |
| KR | 20040050550 | 6/2004 |
| KR | 20040078955 A | 9/2004 |
| KR | 20050035336 A | 4/2005 |
| KR | 20050045716 A | 5/2005 |
| KR | 20050105139 A | 11/2005 |
| RU | 8141 U1 | 10/1998 |
| WO | WO9800787 A1 | 1/1998 |
| WO | WO2004044605 A2 | 5/2004 |
| WO | WO2007040891 A1 | 4/2007 |

OTHER PUBLICATIONS

Karbassi and Barth, "Vehicle Route Prediction and Time of Arrival EstimationTechniques for Improved Transportation System-Management, in Intelligent Vehicles Symposium." 2003. p. 51 1-516.

Krumm, "Real Time Destination Prediction Based on Efficient Routes. SAE 2006Transactions Journal of Passenger Cars—Electronic and Electrical Systems", 2006.

Krumm and Horvitz, "Predestination: Inferring Destinations from Partial Trajectories,in Eighth International Conference on Ubiquitous Computing," (UbiComp 2006). 2006: OrangeCounty, California, USA. p. 241-260.

Krumm et al., "Map Matching with Travel Time Constraints, in Society of Automotive Engineers (SAE) 2007World Congress," 2007, Paper Jan. 1, 2007—102:Detroit, Michigan USA.

Patterson et al., "Inferring High-Level Behavior from Low-Level Sensors, in UbiComp 2003: Ubiquitous Computing," 2003, Springer: Seattle, Washington USA. p. 73-89.

Agne Brilingaite. Online route prediction for automotive applications. http://www.cs.aau.dk/~csj/Papers/Files/2006_brilingaitelTSS.pdf. Last accessed May 14, 2008, 9 pages.

Simmons et al. "Learning to Predict Driver Route and Destination Intent, in 2006 IEEE Intelligent Transportation Systems Conference," 2006: Toronto, Canada. p. 127-1 32.

Torkola et al."Traffic Advisories Based on Route Prediction, in Workshop on Mobile Interaction with the Real World (MIR W 2007)," 2007: Singapore.

Kari Laasonen. Route Prediction from Cellular Data. http://www.cs.helsinki.fi/group/context/pubs/caps05.pdf. Last accessed May 14, 2008, 10 pages.

Peter Lamb, et al. Avoiding Explicit Map-Matching in Vehicle Location. http://users.rsise.anu.edu.au/~thiebaux/papers/its99.doc. Last accessed May 14, 2008, 9 pages.

"Smart WiFi for Android," S4BB Limited, retrieved on Nov. 4, 2011 from <<http://www.s4bb.com/software/smartwifi/smartwifi-for-android/>>, 5 pages.

Benzoon, "SmartWiFi for BlackBerry: A Battery Power Optimizer," retrieved on Nov. 4, 2011 at <<http://www.blackberryinsight.com/2011/06/03/smartwifi-for-blackberry-a-battery-power-optimizer/>>, Jun. 3, 2011, 10 pages.

Spreitzer et al., "Architectural Considerations for Scalable, Secure, Mobile Computing with Location Information," In the 14th International Conference on Distributed Computing Systems, Jun. 1994, pp. 29-38.

Spreitzer et al., "Providing Location Information in a Ubiquitous Computing Environment," SIGOPS '93, Dec. 1993, pp. 270-283.

Spreitzer et al., "Scalable, Secure, Mobile Computing with Location Information," Communications of the ACM, Jul. 1993, vol. 36, No. 7, p. 27.

Starner, "Wearable Computing and Contextual Awareness," Massachusetts Institute of Technology, Jun. 1999, 248 pages.

Tanaka et al, "A Destination Predication Method Using Driving Contents and Trajectory for Car Navigation Systems," SAC'09, Mar. 2009, pp. 190-195.

Theimer et al., "Operating System Issues for PDAs," In Fourth Workshop on Workstation Operating Systems, Oct. 1993, 7 pages.

van Setten et al, "Context-Aware Recommendations in the Mobile Tourist Application COMPASS," AH 2004, Eindhoven, The Netherlands, LNCS 3137, Springer-Verlag, Aug. 2004, pp. 235-244.

Want et al, "Active Badges and Personal Interactive Computing Objects," IEEE Transactions on Consumer Electronics, Feb. 1992, vol. 38, No. 1, pp. 10-20.

Want et al., "The Active Badge Location System," ACM Transactions on Information Systems, Jan. 1992, vol. 10, No. 1, pp. 91-102.

Weiser, "Some Computer Science Issues in Ubiquitous Computing," Communications of the ACM, Jul. 1993, vol. 36, No. 7, pp. 75-84.

Weiser, "The Computer for the 21st Century," Scientific American, Sep. 1991, pp. 94-104.

Workshop on Wearable Computing Systems, Aug. 19-21, 1996, 3 pages.

Beard, et al., "Estimating Positions and Paths of Moving Objects", Seventh International Workshop on Temporal Representation and Reasoning (TIME 2000), Jul. 2000, 8 pages.

Choi, et al., "Performance Evaluation of Traffic Control Based on Geographical Information", IEEE International Conference on Intellegent Computing and Intelligent Systems (ICIS2009), Dec. 2009, pp. 85-89.

International Search Report dated Jan. 15, 2007 for PCT Application Serial No. PCT/US2006/034608, 3 pages.

Translation of JP Office Action dated May 31, 2011 for JP Patent Appln 2008-533377, 6 pages.

Krumm, et al., "Predestination: Where Do You Want to Go Today?", Computer, vol. 40, Issue 4, Apr. 2007, pp. 105-107.

Lee, et al., "Design and implementation of a movement history analysis framework for the taxi telematics system", Proceedings of the 14th Asia-Pacific Conference on Communications (APCC2008), Oct. 2008, 4 pages.

Liu, et al., "Remaining Delivery Time Estimation based Routing for Intermittently Connected Mobile Networks", 28th International Conference on Distributed Computing Systems Workshops, Jun. 2008, pp. 222-227.

Miyashita, et al., "A Map Matching Algorithm for Car Navigation Sytems that Predict User Destination", Advanced Information Networking and Applications (AINAW) Workshops 2008, Mar. 2008, 7 pages.

Sananmongkhonchai, et al., "Cell-based Traffic Estimation form Mutliple GPS-Equipped Cars", IEEE Region 10 Conference, TENCONN 2009, Jan. 2009, 6 pages.

Terada, et al., "Design of a Car Navigation System that Predicts User Destination", Proceedings of the 7th International Conference on Mobile Data Management (MDM'06), May 2006, 6 pages.

Vaughan-Nichols, "Will Mobile Computing's Future be Location, Location, Location?", Computer, vol. 42, Issue 2, Feb. 2009, pp. 14-17.

Wei, et al., "Development of Freeway Travel Time Forecasting Models by Integrating Different Sources of Traffic Data", IEEE Transactions on Vechicular Technology, vol. 56, No. 6, Nov. 2007, pp. 3682-3694.

(56) References Cited

OTHER PUBLICATIONS

Wu, et al., "A Dynamic Navigation Scheme for Vehicular Ad Hoc Networks", Latest Trends on Communications, Aug. 2010, pp. 85-90.
Xie, et al., "Development of Navigation System for Autonomous Vehicle to Meet the DARPA Urban Grand Challenge", Proceedings of the IEEE Intelligent Transportation Systems Conference, Sep. / Oct. 2007, pp. 767-772.
Ye, et al., "Predict Personal Continuous Route", Proceedings of the 11th International IEEE Conference on Intelligent Transportation Systems, Oct. 2008, pp. 587-592.
Brush, et al., U.S. Appl. No. 12/970,974, "Mobile Search Based on Predicted Location", filed Dec. 17, 2010.
Viola, et al., U.S. Appl. No. 13/088,040, "Suggestive Mapping," filed Apr. 15, 2011.
"About Project Playlist," retrieved on Apr. 9, 2008 from <<http://www.playlist.com/statc/node/491.html>>, 3 pages.
Bhawalkar et al., "ScheduleNanny Using GPS to Learn the User's Significant Locations, Travel Times and Schedule," retrieved at <<http://arxiv.org/ftp/cs/papers/0409/0409003.pdf>>, Sep. 2, 2004, 7 pages.
Biegel et al., "A Framework for Developing Mobile, Context-Aware Applications," Proceedings of the Second IEEE Annual Conference on Pervasive Computing and Communications, 2004, Mar. 14-17, 2004, 5 pages.
Billinghurst et al., "An Evaluation of Wearable Information Spaces," Proceedings of the Virtual Reality Annual International Symposium, Mar. 1998, 8 pages.
Billinghurst, "Research Directions in Wearable Computing," University of Washington, May 1998, 48 pages.
Billinghurst et al., "Wearable Devices: New Ways to Manage Information," IEEE Computer Society, Jan. 1999, pp. 57-64.
Bisdikian et al., "Intelligent Pervasive Middleware for Context-Based and Localized Telematics Services," Sep. 2002, pp. 15-24.
"Changes to Lists on Spaces with the Last Release", retrieved on Apr. 9, 2008 at <<http://thespacecraft.spaces.live.com/blog/cns!8AA 773FEOA 1289E3!36422.entry>>, 4 pages.
Chen et al., "A Survey of Context-Aware Mobile Computing Research," Dartmouth Computer Science Technical Report, Nov. 2000, 16 pages.
Coactive TV, Teleshuttle, retrieved on Mar. 28, 2011 at <<http://teleshuttle.com/CoTV/>>, 2 pages.
"Configuring Multiple SSIDs," Cisco IOS Software Configuration Guide for Cisco Aironet Access Points 12.3(7)JA, retrieved from ,,http://www.cisco.com/en/US/docs/wireless/access_point/12.3_7_JA/configuration/guide/s37ssid.html>> on Nov. 4, 2011, 5 pages.
Console et al, "Adaptation and Personalization on Board Cars: A Framework and Its Application to Tourist Services," Adaptive Hypermedia and Adaptive Web-Based Systems, Lecture Notes in Computer Science, vol. 2347-2006, Springer-Verlag Berlin, Heidelberg, May 2002, pp. 112-121.
Extended European Search Report for EP 07796299.1 dated Oct. 12, 2011, 7 pages.
Falaki, "WLAN Interface Management on Mobile Devices," University of Waterloo, Waterloo, Ontario, Canada, 2008, 88 pages.
Harter et al., "A Distributed Location System for the Active Office," IEEE Network, Jan./Feb. 1994, pp. 62-70.
Horvitz et al., "Attention-Sensitive Alerting," Proceedings of the UAI' 99 Conference on Uncertainty and Artificial Intelligence, Jul. 1999, 10 pages.
Horvitz et al., "Attention-Sensitive Alerting in Computing Systems," Microsoft Research, Aug. 1999, 26 pgs.
Horvitz et al, "Bayesphone: Precomputation of Context-Sensitive Policies for Inquiry and Action in Mobile Devices," Proceedings of the Tenth Conference on User Modeling (UM 2005), Jul. 2005, Edinburgh, Scotland, 11 pages.
Horvitz et al, "Coordinate: Probabilistic Forecasting of Presence and Availability," Eighteenth Conference on Uncertainty and Artificial InteliiQence, Jul. 2002, pp. 224-233.

Horvitz et al., "Display of Information for Time-Critical Decision Making," Proceedings of the Eleventh Conference on Uncertainty in Artificial Inteligence, Aug. 1995, 10 pages.
Horvitz et al., "In Pursuit of Effective Handsfree Decision Support: Coupling Bayesian Inference, Speech Understanding, and User Models," 1995, 8 pages.
Horvitz et al., "Learning and Reasoning about Interruption," Fifth International Conference on Multimodal Interfaces, Nov. 2003, pp. 20-27.
Horvitz et al., "Mobile Opportunistic Planning: Methods and Models," Proceedings of the Eleventh Conference on User Modeling (UM 2005), Jun. 2007, Corfu, Greece, pp. 238-247.
Joachims, "Text Categorization with Support Vector Machines: Learning with Many Relevant Features," Machine Learning, European Conference on Machine Learning, Apr. 21, 1998, pp. 137-142.
Kamar et al., "Mobile Opportunistic Commerce: Mechanisms, Architecture, and Application," Proceedings of AAMAS 2008, Estoril, Portugal, May 2008, 8 pages.
Kargl et al., "Smart Reminder—Personal Assistance in a Mobile Computing Environment," Pervasive 2002, Zurich, Switzerland, Aug. 26-28, 2002, 6 pages.
Kostove et al., "Travel Destination Prediction Using Frequent Crossing Pattern from Driving History," Proceedings fo the 8th International IEEE Conference on Intelligent Transportation Systems, Vienna, Austria, Sep. 13-16, 2005, pp. 970-977.
Machine translation of submitted KR Application: KR-2003-0070622, Pub KR20050035336, published Apr. 18, 2005, 9 pgs.
Machine translation of submitted KR Application: KR-2005-0096785, Pub KR20050105139, published Nov. 3, 2005, 4 pages.
Krumm et al., "Predestination: Inferring Destinations from Partial Trajectories," UbiComp 2006: Eighth International Conference on Ubiquitous Computing, Sep. 2006, 18 pages.
Krumm, "Where Will They Turn: Predicting Turn Proportions At Intersections," Personal and Ubiquitous Computing (2010), 14:7, Oct. 2010, 13 pgs.
Letchner et al., "Trip Router with Individualized Preferences (TRIP): Incorporating Personalization into Route Planning," Eighteenth Conference on Innovative Applications of Artificial Intelligence, Jul. 2006, 6 pages.
Liu et al, "Location Awareness Through Trajectory Prediction," Department of Information Science and Telecommunications, University of Pittsburgh, Pittsburgh, Pennsylvania, May 2006, pp. 1-38.
Losee, Jr., "Minimizing information overload: the ranking of electronic messages," Journal of Information Science 15, Elsevier Science Publishers BV, Jun. 1989, pp. 179-189.
Mapquest.com Features, retrieved on Oct. 27, 2010 at <<http://features.mapquest.com/>> 3 pages.
"Nagra's cross-device user experience wins, "Advanced User Interface" Award at TV 3.0 conference," retrieved on Mar. 28, 2011 at <<ttp://www.advanced-television.tv/index.php/2010/12/21/nagra%E2%80%99s-cross-device-user-experience-wins-%E2%80%9Cadvanced-user-interface%E2%80%9D-award-at-tv-3-0-conference/>>, 4 pages.
Orebaugh et al, "Wireless Sniffing with Wireshark," Wireshark & Ethereal Network Protocol Analyzer Toolkit, Chapter 6, Sep. 2006, pp. 6:1-6:104.
PCT International Search Report dated Sep. 29, 2003 for PCT Application Serial No. 00/20685, 5 Pages.
PCT International Search Report and Written Opinion for PCT/US20071014405 dated Dec. 11, 2007, 6 pages.
Persad-Maharaj et al., "Real-Time Travel Path Prediction Using GPS-Enabled Mobile Phones," Presented at the 15th World Congress on Intelligent Transportation Systems, New York, New York, Nov. 16-20, 2008. Paper # 30413, 12 pages.
Publicis & Yahoo Team for Cross-Carrier Marketing, retrieved Mar. 28, 2011 at <<http://www.mobilemarketingwatch.com/tag/cross-device-marketing/>>, 4 pages.
Rhodes et al, "Remembrance Agent: A continuously running automated information retrieval system," The Proceedings of the First International Conference on the Practical Application of Intelligent Agents and Multi Agent Technology, Apr. 1996, pp. 487-495.

(56) References Cited

OTHER PUBLICATIONS

Rhodes, "The Wearable Remembrance Agent: A System for Augmented Theory," The Proceedings of the First International Symposium on Wearable Computers, Oct. 1997, 9 pages.
Schilit et al., "Context-Aware Computing Applications," In Proceedings of the Workshop on Mobile Computing Systems and Applications, Dec. 1994, pp. 85-90.
Schilit et al., "Customizing Mobile Applications," Proceedings USENIX Symposium on Mobile and Location Independent Computing, Aug. 1993, 9 pages.
Schilit et al., "Disseminating Active Map Information to Mobile Hosts," IEEE Network, Sep.-Oct. 1994, vol. 8-No. 5, pp. 1-23.
Schilit et al., "The ParcTab Mobile Computing System," IEEE WWOS-IV, Oct. 1993, 4 pages.
Schilit, "A System Architecture for Context-Aware Mobile Computing," Columbia University, 1995, 153 pages.
Krumm, et al., U.S. Appl. No. 12/170,068, "Route Prediction", filed Jul. 9, 2008.
Horvitz, et al., U.S. Appl. No. 60/721,879, "Predestination", filed Sep. 29, 2005.
International Search Report & Written Opinion for PCT Patent Application No. PCT/US2013/050963, dated Nov. 8, 2013, 14 pages.
Partial Supplementary European Search Report dated Jan. 22, 2015 for European Patent Application No. 13754084.5, 5 pages.
Office Action for U.S. Appl. No. 12/970,974, dated Mar. 6, 2013, Brush, "Mobile Search Based on Predicted Location", 15 pages.
Office Action for U.S. Appl. No. 13/407,181, dated Aug. 28, 2014, Chandra et al. "Energy Efficient Maximization of Network Connectivity", 14 pages.
Final Office Action for U.S. Appl. No. 12/970,974, dated Sep. 12, 2013, Brush, "Mobile Search Based on Predicted Location", 16 pages.
European Office Action dated Jun. 9, 2015 for European patent application No. 13754084.5, a counterpart foreign application of U.S. Appl. No. 13/407,181, 6 pages.
Supplementary European Search Report dated May 18, 2015 for European Patent Application No. 13754084.5, 5 pages.
Office action for U.S. Appl. No. 13/407,181, dated Mar. 27, 2015, Chandra et al., "Energy Efficient Maximization of Network Connectivity", 21 pages.
Office action for U.S. Appl. No. 13/407,181, dated May 26, 2016, Chandra et al., "Energy Efficient Maximization of Network Connectivity", 18 pages.
European Office Action dated Dec. 12, 2016 for European Patent Application No. 16184375.0, a counterpart foreign application of U.S. Appl. No. 13/407,181, 6 pages.
Supplementary European Search Report dated Nov. 30, 2016 for European Patent Application No. 16184375.0, 4 pages.
Office Action for U.S. Appl. No. 13/407,181, dated Nov. 23, 2016, Chandra et al. "Energy Efficient Maximization of Network Connectivity," 20 pages.

\* cited by examiner

ROUTE PREDICTION

TECHNICAL FIELD

The subject specification relates generally to route prediction and in particular to using a Markov model to determine likelihood of a user making a travel decision.

BACKGROUND

Computer-driven route planning applications are utilized to aid users in locating points of interest, such as particular buildings, addresses, and the like. Additionally, in several existent commercial applications users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that can be pertinent to the user.

Furthermore, conventional computer-implemented mapping applications often include route-planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she wishes to avoid highways. Similarly, a user can inform the route planning application that she wishes to travel on a shortest route or a route that takes a least amount of time.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Commonly, a user travel along certain routes multiple times, such a main road near her home. When the user reaches an intersection, there are commonly at least two choices that can be made. Based on a wide-variety of factors, the user makes a decision regarding the intersection that can be collected as part of a user travel history. There can be benefit in understanding a likelihood of a user making a particular decision and a Markov model can be used to determine a likelihood of a user making a selection at an intersection based upon her travel history.

When the user nears the intersection, personal travel history as well as contextual information can be collected. The Markov model can use the history to determine a decision the user is more likely to make. Information can be provided to the user concerning the more likely route, such as traffic patterns, construction, weather conditions, and the like. An observation can be made if the prediction is correct and based upon the observation the Markov model can be trained and user travel history updated.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
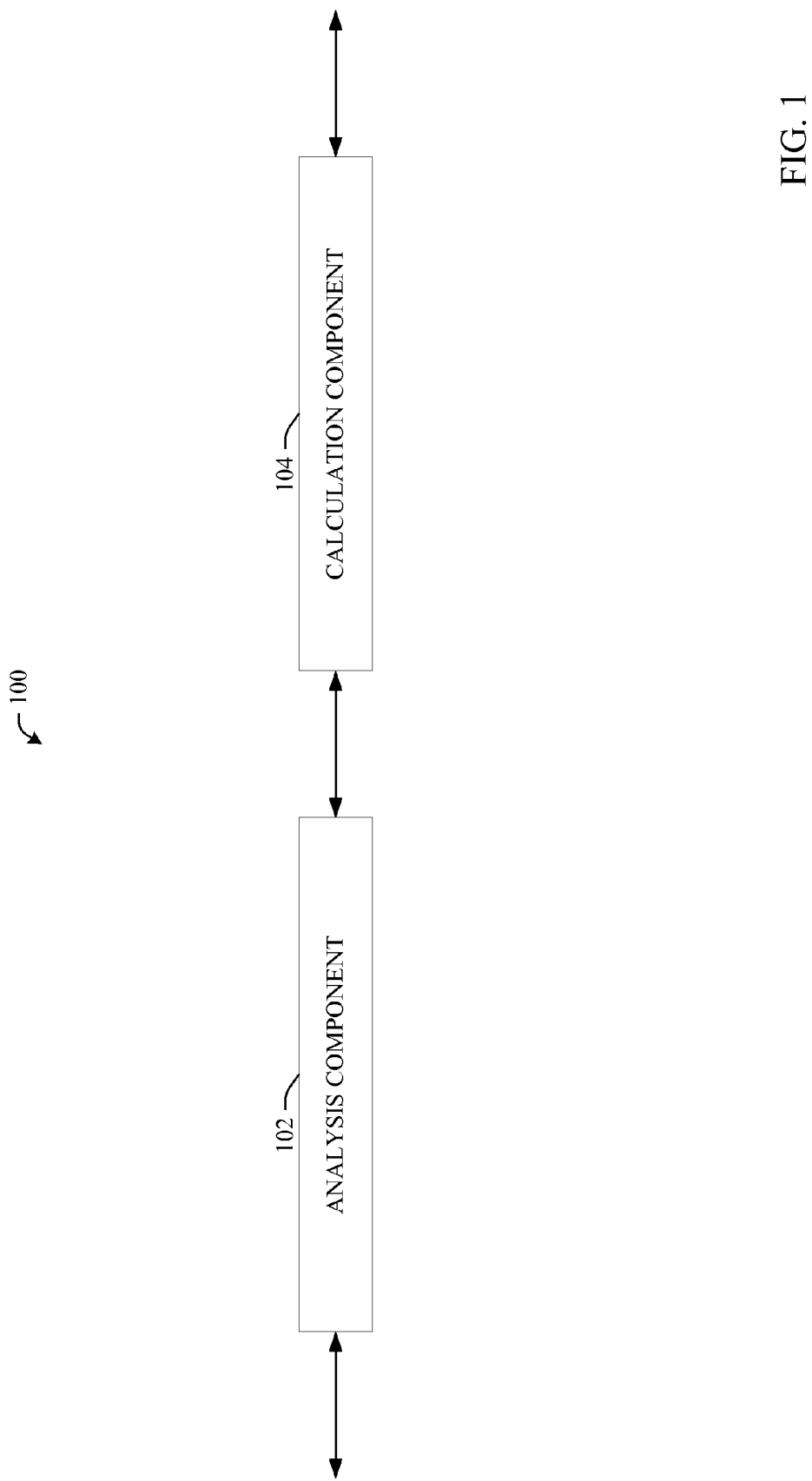
FIG. 1 illustrates a representative system for determining likelihood of a user making a choice concerning a travel path decision in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Now referring to FIG. 1, an example system 100 is disclosed for making short term route prediction for vehicles. A user history can be collected (e.g., through global positioning data) and a Markov model can be used to make probabilistic predictions based upon the collected history. Different outcomes for a road segment can be assigned a likelihood percentage on how likely a user is to take an outcome and the likelihood percentages can be used to perform a variety of tasks, such as create a user route, provide warnings to the user, and the like.

Predicting a driver's near-term future path could be useful for giving the driver warnings about upcoming road situations, delivering anticipatory information, and allowing a vehicle to automatically adapt to expected operating conditions. A prediction algorithm can be used and trained from a driver's history. Specifically, training can occur through an $n^{th}$-order Markov model to probabilistically predict future road segments based on a short sequence of just-driven road segments. The algorithm can be simple enough to be trained and executed on an in-vehicle navigation computer and can be implemented without off-board network connection.

A user history can be created and an analysis component 102 can evaluate travel history of an entity (e.g., a user, a user classification, a vehicle, etc.). A result of the evaluation can be accessed by a calculation component 104 that can use a Markov model to compute a route likelihood (e.g., percentage chance that a user takes an outcome of at least one intersection) as a function of the result of the evaluation. Commonly, the route likelihood is the probability a user takes different outcomes of at least one travel decision point (e.g., a road intersection). In addition, outcomes of travel decision points are typically independent of one another such that the route likelihood is a function of an outcome of at least two travel decision points. According to one embodiment, the Markov model can make a prediction based on only a single previous observation of a road segment.

Different outcomes can take place regarding the route likelihood. For example, a user can reach an intersection about ten times, where the intersection can have two realistic outcomes—turning right and turning left. A realistic outcome is an outcome of a user making a reasonable choice or/and outcome that conforms to normal traffic patterns (e.g., following traffic laws). For example, making a U-turn, performing an illegal operation (e.g., driving straight onto private property), and the like can be considered unrealistic since there can be a relatively low probability a user makes that decision. Based upon user history, a Markov model can be used to determine how likely the user is to make each decision. For instance, x % can be associated with turning right and 100%-x % can be associated with turning left.

These likelihoods can be used in conjunction with different functionality. For example, if an outcome has a likelihood over a specific threshold, then a check can be performed if there are hazards that should become known to the user (e.g., road closure, traffic jam, and the like). User action can be monitored such that a determination can be made on what outcome a user selects. The selected outcome can be aggregated upon user history as well as used to modify the Markov model.

While much discussion is dedicated to travel history of a person, it is to be appreciated that other forms of travel history can be used. In one instance, a public transit company can use a bus for a specific route—however, different drivers control the bus on different days. Therefore, as opposed to using driver history, vehicle travel history can be used since the vehicle is likely more indicative of travel then a driver. In addition, history of a user classification can be used—if a user does not have a history of travel along a particular path, then history of similarly situated users can be used to determine likelihood of outcomes.

The following is to be used as an explanation of a potential Markov model that can be used in conjunction with aspects disclosed herein. It is to be appreciated that there can be deviation from the following model information. Prediction of a vehicle's near term future route can be based on its near term past route. A model of the sequence of traversed road segments can be as X(i), with i representing a discrete time variable and X(–) representing a road segment (e.g. an integer unique among all the road segments). Whenever a prediction is made, the vehicle's road segments can be denoted as { . . . , X (–2), X (–1), X (O), X (1), X(2), . . . ), where X (0) is the current road segment, X(–1), X(–2), . . . are the immediately preceding road segments, and X(1), X(2), . . . are the unknown future road segments that are predicted. The road segments are not necessarily encountered at even time intervals. The discrete time variable i serves as an index over the segments in the order they are encountered. When the vehicle moves to a new road segment, that segment becomes the new X(0). At any time, the current road segment X(0) is known and the past road segments { . . . , X(–3) X(–2),X(–1)} back to the beginning of the trip. The unknowns are the future road segments that are predicted are, {X(1), X(2), X(3), . . . }.

At any point along a trip, the driver can choose which road segment to drive on next. In light of this choice, our predictions are probabilistic. For instance, P[X(1)] represents a discrete probability distribution over all the road segments giving which road segment will be encountered after the current one, X(0). P[X(2)] is the distribution for which road segment will be encountered after X(1), and so on. The Markov model gives a probabilistic prediction over future road segments based on past road segments. The standard, first order Markov model says that the probability distribution P[X(1)] for the next road segment is independent of all but X(O), the current road segment:

$$P[X(1)|X(0),X(-1),X(-2), \ldots ]=P[X(1)|X(O)]$$

For a given driver, a P[X(1)|X(O)] can be easily built. For each road segment X(O), a histogram can be built of which road segments were encountered immediately after, and then normalized to get a discrete probability distribution. There can be a separate probability distribution for each road segment that a driver has ever driven on. A second order Markov model is sensitive to the two most recent road segments, e.g., P[X(1)|X(–1), X(O)]. This model can be built in a similar way, except there can be creation of a histogram over all two-element, ordered sequences {X(–1), X(O)}. There can be a check to see if using higher order models helps prediction accuracy. In particular, looking at the two most recent road segments gives a sense of the direction of travel along a road. For a first order model, the direction of travel is not encoded by observing only the current road segment. The Markov model can be used to predict beyond just the next road segment. There can be building of a P[X(2)|X(O)], which is the distribution over the road segments after the next one, given the current one. Higher order models can be used to make these farther out predictions, e.g. P[X(2)|X(-I), X(O)]. In general, there can be building of an $n^{th}$ order Markov model (n≥1) to predict the mth next encountered segment (m≥1). The generation $n^{th}$ order model can be denoted as:

$$Pn[X(m)]=P[X(m)|X(-n+1),X(-n+2), \ldots ,X(0)]$$

There can be a note that the Markov model does not explicitly constrain a vehicle to adhere to the connectedness of the road network. A trained model could conceivably predict that a driver will jump over several road segments. However, since the model is trained from real data, where such jumps do not occur, the Markov model implicitly prevents such nonsense predictions. One advantage of probabilistic predictions is that the algorithm has a measure of its own uncertainty that can be usefully reported to in-vehicle applications. For instance, automatically engaging a turn signal might depend on near 100% prediction certainty, while presenting a point of interest would not require the same level of confidence.

Sometimes, there are fewer past road segments to examine, either because the trip just started or because there isn't a long enough match sequence in the driver's recorded history of road segments. Prediction accuracy can increase as the number of observed segments increases, meaning that a longer sequence of road segments is more indicative of the future. There can be a significant jump in prediction accuracy between one and two observed segments. This is because observing only one segment is not indicative of a driver's direction, meaning that the vehicle could be heading toward either end of the current segment. Observing two or more past segments indicates the driver's direction and reduces the possibilities for future segments.

Figure 2:
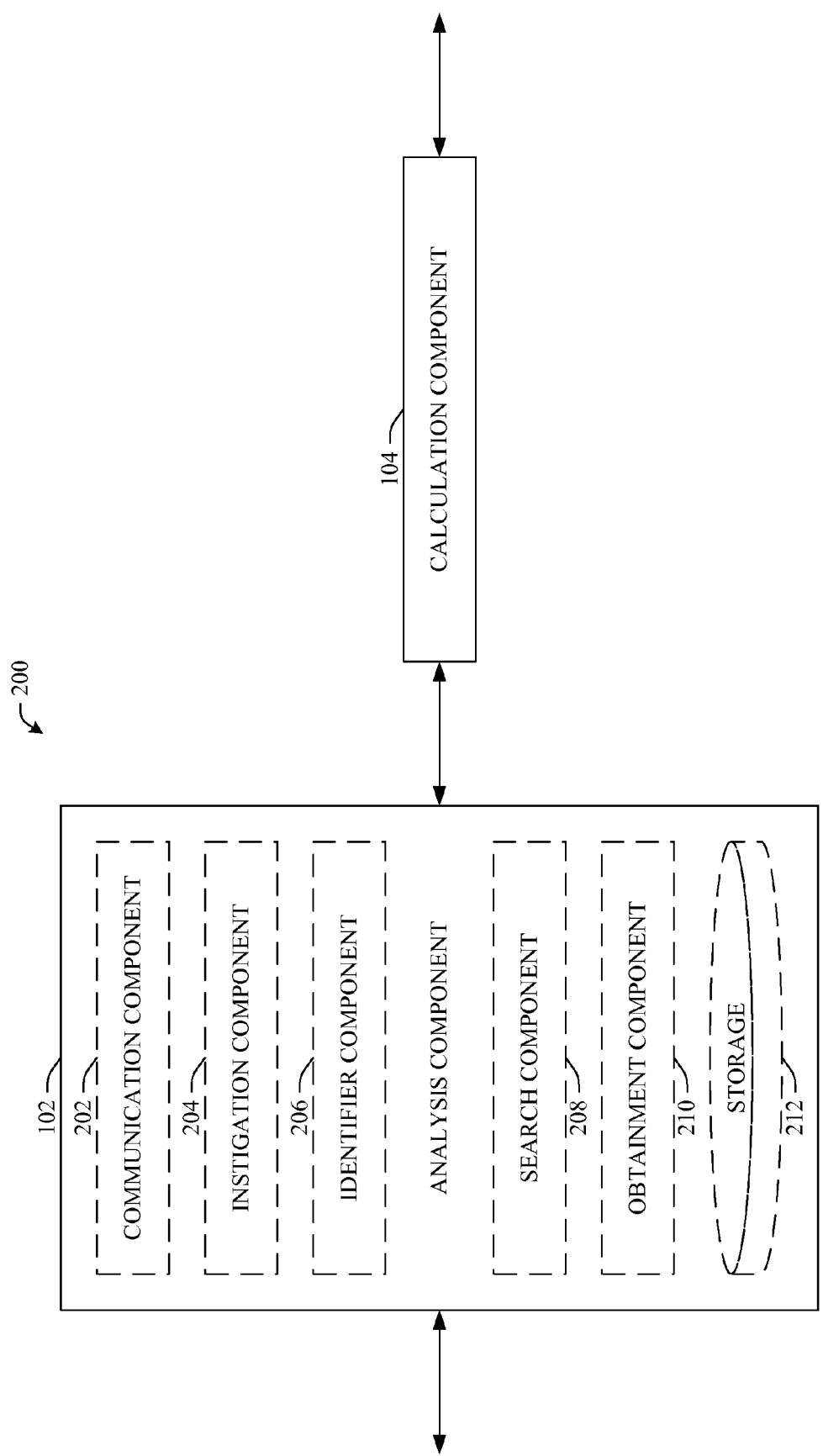
FIG. 2 illustrates a representative system for determining likelihood of a user making a choice concerning a travel path decision with a detailed analysis component in accordance with an aspect of the subject specification.

Now referring to FIG. 2, an example system 200 is disclosed for determining route likelihood through use of a Markov model with a detailed analysis component 102. A user history can be collected and evaluated by the analysis component 102, where the analysis component 102 can function as means for analyzing history concerning at least one travel decision point. A communication component 202 can be used by the analysis component 102 to engage with other devices to transfer information. Operation can take place wirelessly, in a hard-wired manner, employment of security technology (e.g., encryption), etc. Additionally, information transfer can be active (e.g., query/response) or passive (e.g., monitoring of public communication signals). Moreover, the communication component 202 can use various protective features, such as performing a virus scan on collected metadata and blocking metadata that is positive for a virus.

An instigation component 204 can be used to determine when the system 200 should operate. Various different configurations can be used to identify when to operate the system 200. According to one embodiment, a check can be performed to determine if a travel decision point exists within a certain distance of a position—if there is a positive result, then the system 200 operates. In a different instance, the system 200 can be instigated at a user request, when multiple decision points are within a set distance, and the like. However, in another embodiment route prediction can virtually always operate when a vehicle implementing the system 200 is running. The route prediction can occur as soon as possible and as far out in the future as possible to provide enough notice to a user.

The instigation component 204 can determine that the system 200 should operate and an identifier component 206 can function to determine a travel history to obtain. For example, the identifier component 206 can determine if user history or if vehicle history should be used. User history can be retained in a separate location and thus a search component 208 can be employed to locate a travel history source. An obtainment component 210 can be used to collect the travel history from the located source.

Different pieces of information, such as the collected travel history, component operating instructions (e.g., communication component 202), source location, components themselves, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a RAID configuration). In addition, storage 212 can operate as memory that can be operatively coupled to a processor (not shown). A calculation component 104 can use a Markov model to compute a route likelihood as a function of a result of the evaluation. The calculation component 104 can function as means for determining likelihood of outcomes of the travel decision point through use of a Markov model and a product of the historical analysis. According to one embodiment, the Markov model can be computed offline and/or remotely based upon user history, such that a vehicle operating the system 200 does not need to be moving to calculate probabilities.

Figure 3:
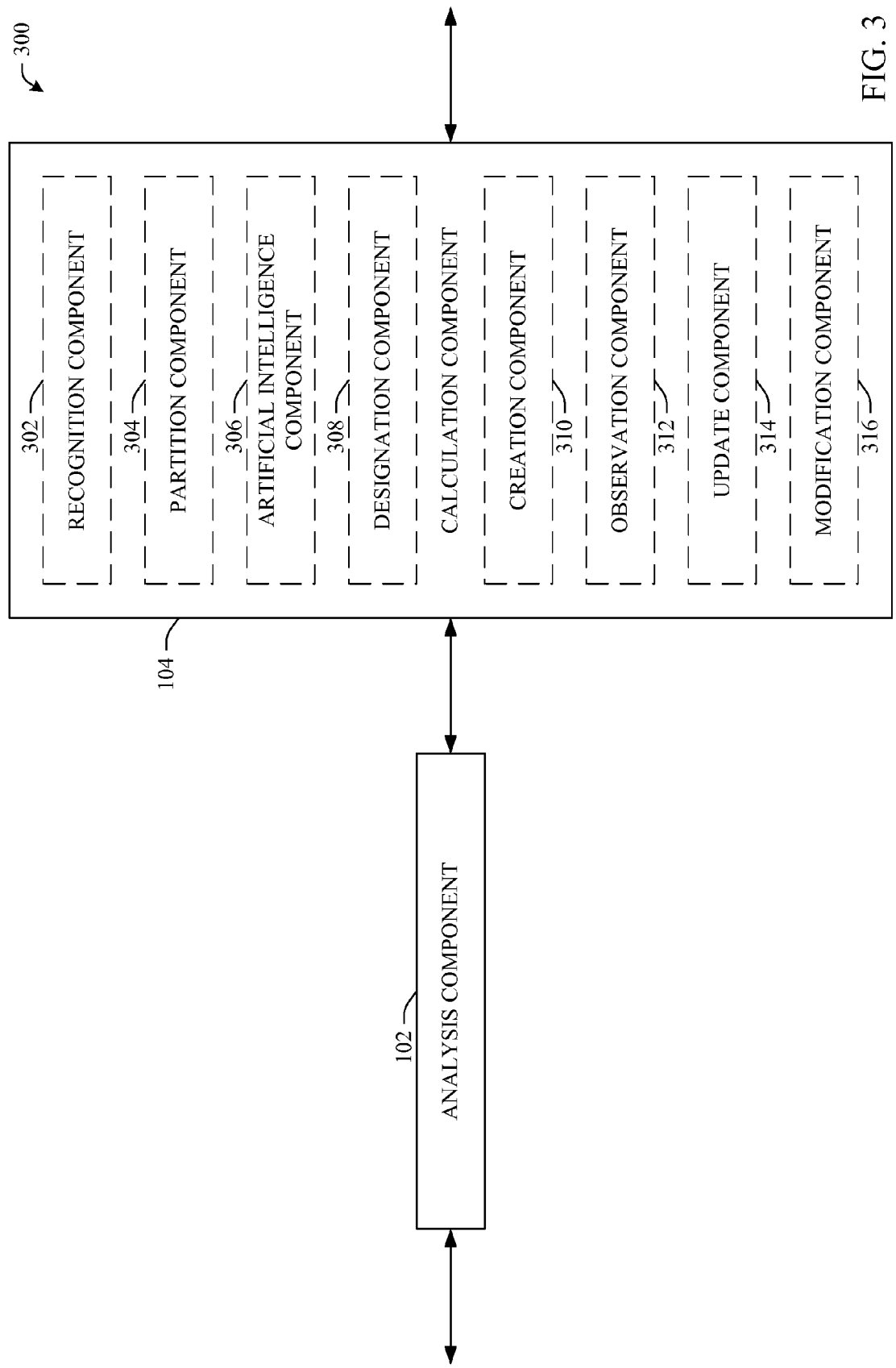
FIG. 3 illustrates a representative system for determining likelihood of a user making a choice concerning a travel path decision with a detailed calculation component in accordance with an aspect of the subject specification.

Now referring to FIG. 3, an example system 300 is disclosed for determining route likelihood through use of a Markov model with a detailed calculation component 104. An analysis component 102 can evaluate travel history of an entity. Based upon a result of the evaluation, a calculation component 104 can use a Markov model to compute a route likelihood.

It can be a waste of resources to perform likelihood estimates on virtually all potential intersections that can be encountered by a vehicle. The system 300 can employ a recognition component 302 that identifies a potential travel space of the entity. Identification can occur through special analysis (e.g., intersections within a set radius of a user), through a set number of intersections (e.g., three degrees of separation from a current position), and the like. The recognition component 302 can operate as means for predicting the travel area, the travel area divided is the predicted travel area.

A partition component 304 can divide the potential travel space into segments (e.g., defined by road intersections). The calculation component 104 can compute the route likelihood through computation of how the entity travels upon termination of a segment (e.g., at an intersection, likelihood of a user turning left, right, or continuing straight). According to one embodiment, partitions can be limited to substantial user decisions (e.g., decisions a user is reasonably likely to take). For example, if a user has an option of continuing straight or turning on a highway run-off, the chance of the user taking the run-off can be so small that the division can be ignored. A balance can be made weighing the chance of a user taking a route against estimated resource consumption. The partition component 304 can function as means for dividing a travel area into at least one travel decision point.

An artificial intelligence component 306 operates the Markov model as well as be used in performing various determinations and inferences disclosed herein. The artificial intelligence component 306 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 306 can also include methods for capture of logical relationships such as theorem provers or more heuristic rule-based expert systems. The artificial intelligence component 208 can be represented as an externally pluggable component, in some cases designed by a disparate (third) party.

The Markov model can be applied upon the user history where there is prediction likelihood of different outcomes. A designation component 308 can identify a highest probability outcome of at least one travel decision point. Based upon the outcome of the designation component 308, a creation component 310 can produce an estimated route based upon highest probability of at least one travel decision point. Thus, outcomes of different decision points can be strung together such that an estimated route is produced.

According to one embodiment, the creation component 310 produces the estimated route based upon highest probability of at least one travel decision point and at least one contextual circumstance. For example, a user can come to an intersection and the Markov model can determine there is about 95% likelihood that a user turns right and about 5% likelihood that a user turns left. However, if the road available to the user by turning right is closed, then the creation component 310 can override a result of the Markov model to determine there is about 100% likelihood the user turns left. The creation component 310 can function as means for creating a travel route based upon a highest result of the determined likelihood for each travel decision point. According to one embodiment, the travel route is created based upon a highest result of the determined likelihood for each travel decision point and contextual information.

An observation component 312 can monitor user operation at a predicted intersection and compare how the user behaved against the prediction. The observation component 312 can implement as means for monitoring a result of at least one travel decision point. An update component 314 can add the observation to the travel history as well as apply a weight to the observation. The update component 314 can operate as means for retaining the result in conjunction with the history. For instance, more recent actions can be considered more relevant that more distant events. Additionally, the calculation component 104 can modify operation through use of a modification component 316 (e.g., modify operation of the Markov model).

Figure 4:
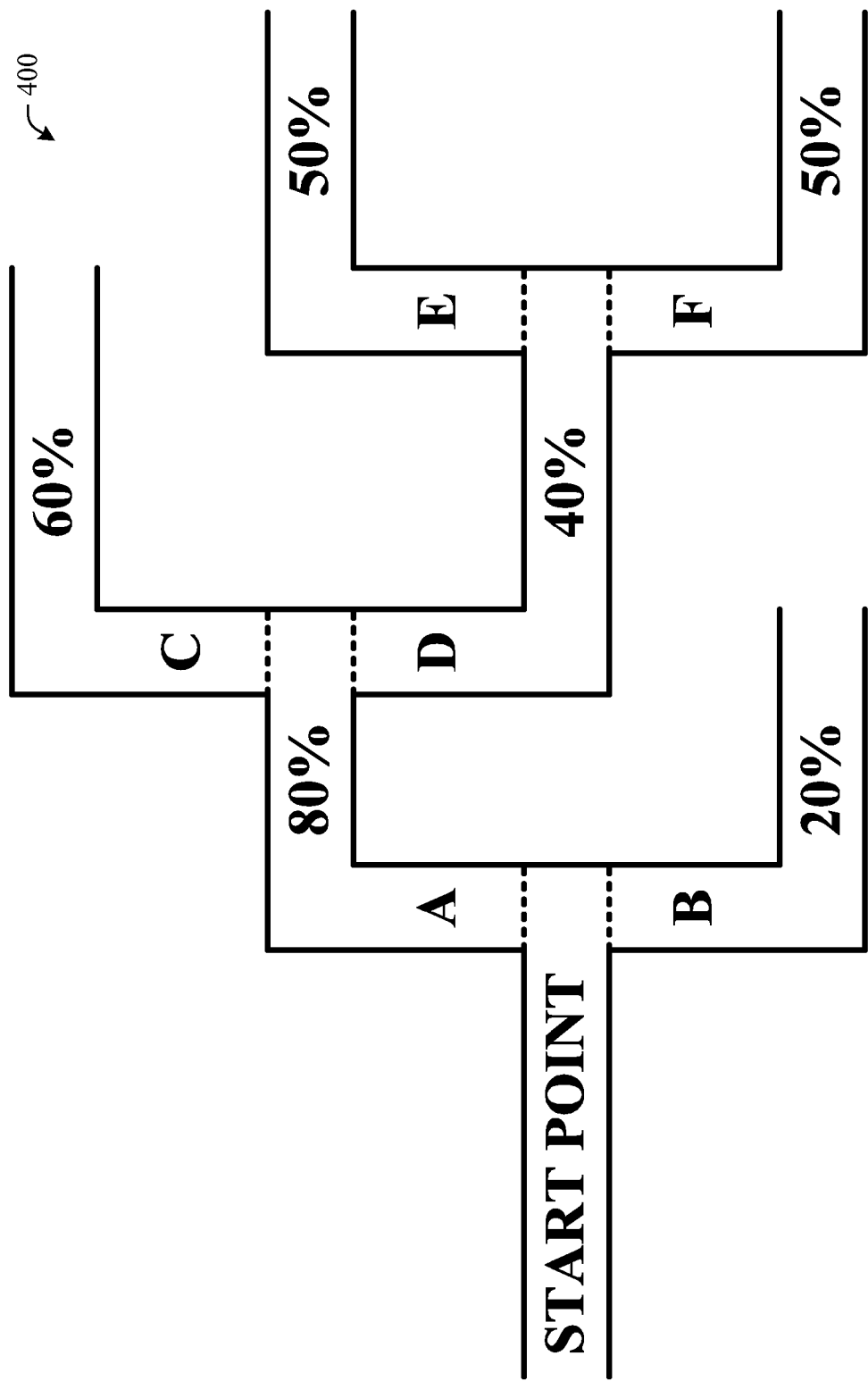
FIG. 4 illustrates a representative travel decision point map associated with percentages of predicted use in accordance with an aspect of the subject specification.

Now referring to FIG. 4, an example travel area 400 is disclosed as segmented by a partition component 304 of FIG. 3. A user can stand at a start point and a determination can be made by the instigation component 204 of FIG. 2 that predictions of user decision points should occur. An initial decision point can be reached with an 'A-B' decision point, where the user can be about four times more likely to make the 'B' decision than the 'A' decision. Additionally, it can be determined that there is a likelihood of a user making a 'C-D' decision point. It is to be appreciated that the decision is independent of the outcome of the 'A-B' decision point. Even if there is a less than half chance the user makes a decision, dependent travel points can be evaluated. In an 'E-F' decision point, a determination can be made that a user has equal likelihood of travelling down either path. An equal designation can be used when there is no user history and/or inadequate user history to make a prediction. In addition, a confidence level can be associated with a prediction (e.g., how strong a basis is for a prediction).

Various uses can be made from the determined likelihoods. For example, the creation component 310 of FIG. 3 can produce a likely route of the user such that the user begins at the start position, then travels down the 'A' path (e.g., since 80% is higher than 20%) and then down the 'C' path. If it is determined that the user is likely to come the 'E-F' decision point, then the creation component 310 can use artificial intelligence techniques to select a route (e.g., since the routes have about equal numerical values). Additionally, information disclosed through FIG. 4 can be used to inform a user of contextual information. For instance, a user can be made aware of heavy traffic on paths with a likelihood of 50% or greater, on a highest path of a decision point, paths that pass a lower threshold, and the like.

Figure 5:
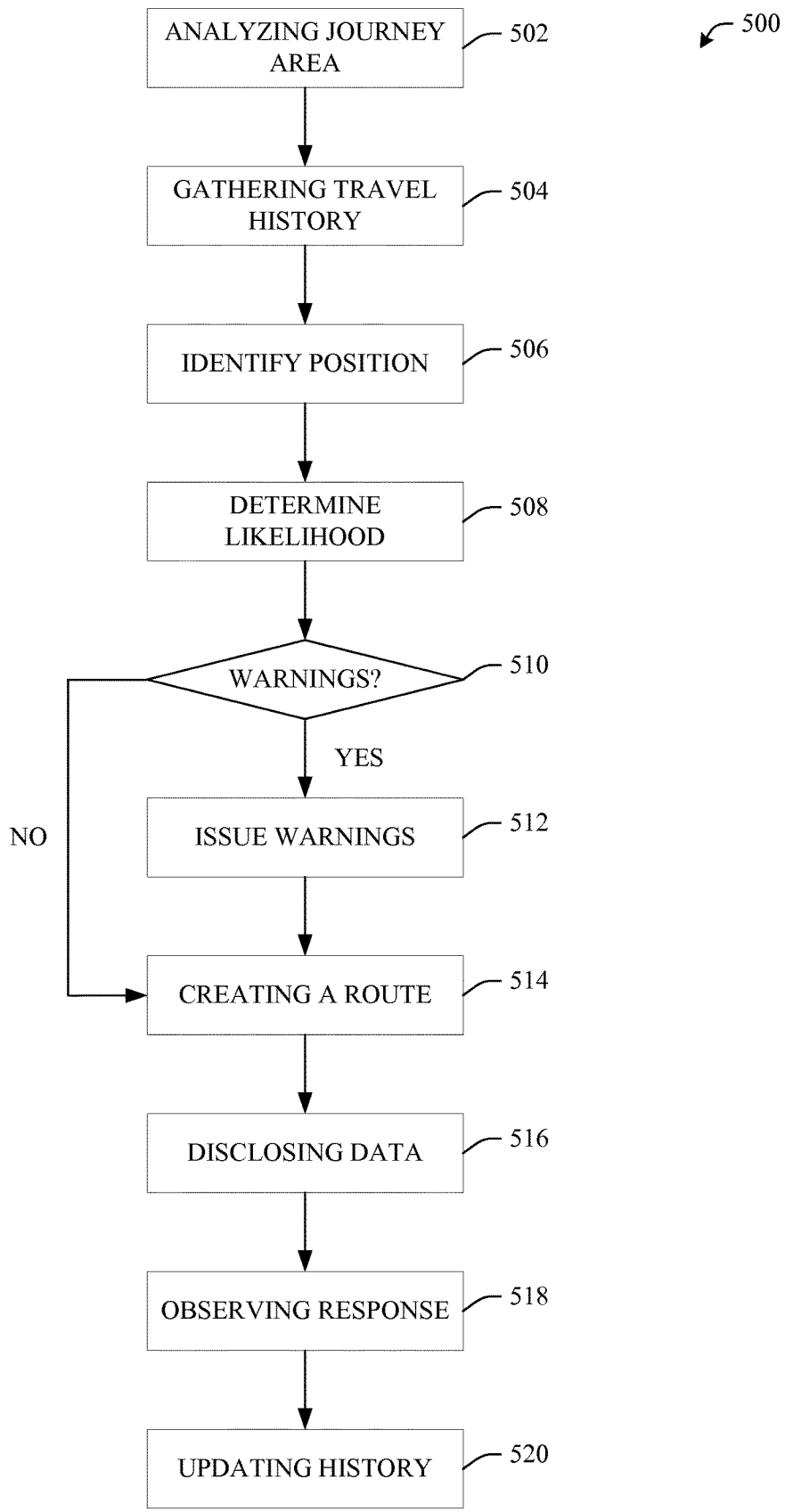
FIG. 5 illustrates a representative methodology for route decision point likelihood prediction using a Markov model in accordance with an aspect of the subject specification.

Now referring to FIG. 5, an example methodology 500 is disclosed for determining likelihood of a user making a decision regarding a travel decision point. Information for a journey area can be collected and analyzed at event 502, a result of the analysis can be used to identify a journey resolution position. Different potential paths of the journey area can be identified and intersections of those paths can be recognized.

Travel history that relates to a user can be collected at action 504. For example, polling can occur to determine locations that include travel information and the information can be extracted and analyzed. At act 506, there can be identifying a journey resolution position, the journey resolution position includes at least two results. According to one embodiment, a remote identity can communicate journey resolution points of an area (e.g., such as a hosting device). However, analysis of a map can occur (e.g., optical scanning) and inferences can be made on what is an journey resolution point.

At action 508, there can be determining likelihood of at least one of the results of the journey resolution position occurring through use of a Markov model. A Markov model can be applied upon user history and percentages can be determined on how likely a user is to make a decision. At check 510, a determination can be made on if a user should be warned about a situation. If there is a situation determined by the check 510, then the user can be warned at act 512. For example, if a percentage identified reaches a certain threshold (e.g., above about 20%), then check 510 can determine that a user should be warned of hazards published by a government organization (e.g., department of transportation, municipal police force, etc.). Example warnings can include Anticipatory driver warnings (e.g., hazardous road conditions, unusually slow traffic, change in speed limit, curve speed warning, change in traffic patterns—such as due to construction, lane keeping assistance, lane change prediction and warning, etc.), driver information (e.g., points of interest, advertising, etc.), automatic vehicle behaviors (e.g., automatic turn signals, headlight pointing, wireless base station handoff, gradual windshield darkening for expected glare, engine load anticipation—such as cylinder deactivation, emergency preparation—such as pre-braking, seat belt tension, head rests . . . , etc.), and the like.

Regardless of the outcome of the check 510, action 514 can occur that include creating a route based upon the highest sequential determined likelihoods. According to one embodiment, the route is sequential, such that route choices are strung together. For instance, a user can have an 'A-B' decision point, where 'A' feeds into 'C-D' decision point and 'B' feeds into 'E-F' decision point. If 'A' has an about 60% chance and 'B' has an about 40% chance, then 'A' is selected as the route. To continue the route, 'E' and 'F' route decisions can be excluded since they are not decisions upon the 'A' route. This can take place even if 'E' or 'F' has a highest percentage, since there is a desire to make the route sequential.

Data pertaining to the decision point can be disclosed (e.g., to a user) at action 516. This can include identified journey resolution positions, associated percentages, warnings, a route, etc. At act 518, there can be observing how an entity responds to the journey resolution position. Based upon the observation, there can be updating a history for the entity based upon the observation at action 520.

Figure 6:
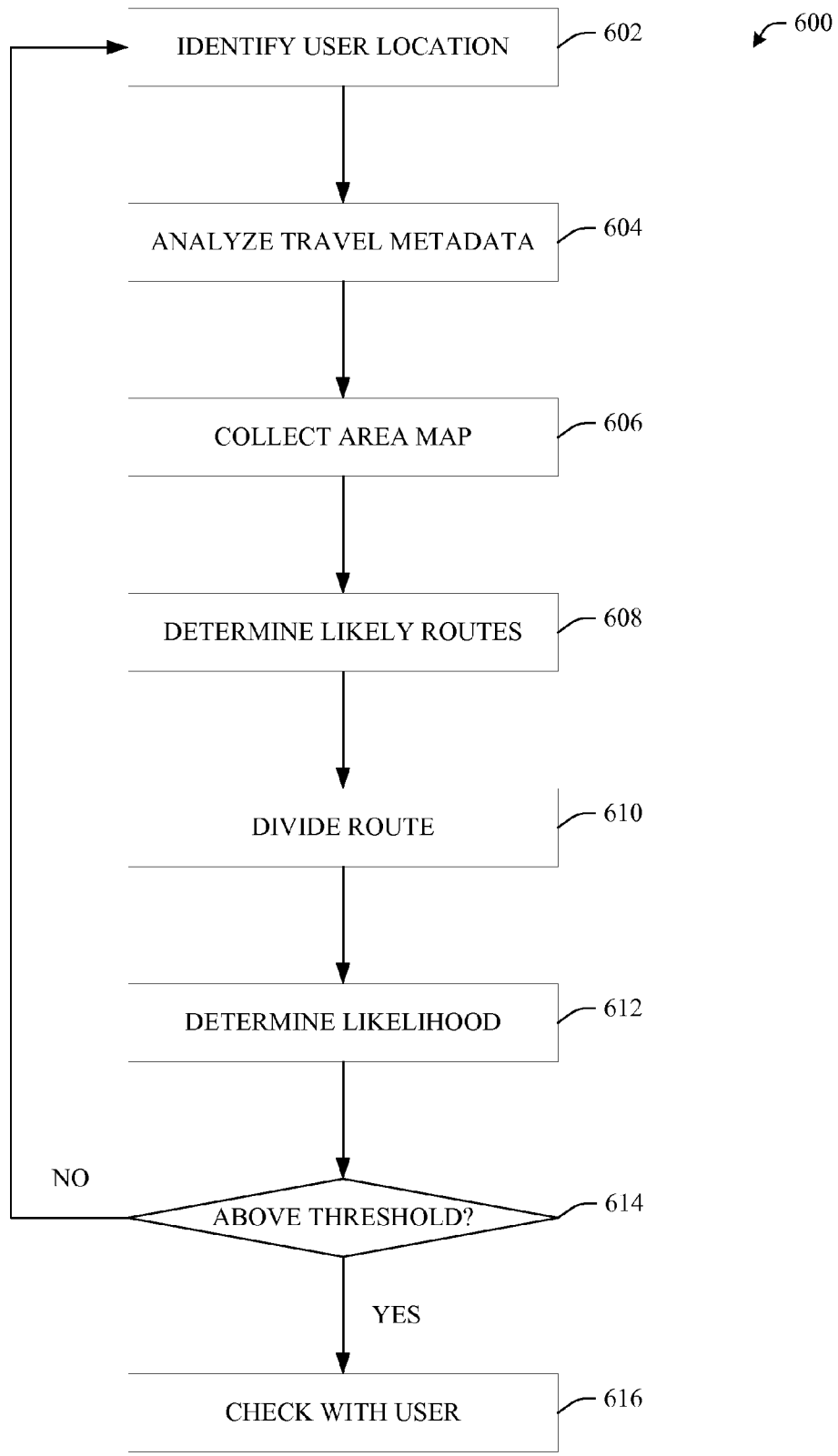
FIG. 6 illustrates a representative methodology for route decision point likelihood prediction with user interaction in accordance with an aspect of the subject specification.

Now referring to FIG. 6, an example methodology 600 is disclosed for engaging with a user concerning determining likelihood of an entity making a travel decision. A user location can be identified at action 602, such as through use of a global positioning system. Travel metadata related to a user (e.g., time of day, information on a user's personal calendar, etc.) can be collected and analyzed, where a result of the analysis is used in determining likelihood of outcomes of a journey resolution point.

A map area upon which a user has potential to travel can be collected at action 606. Based upon the collected map area, routes likely to be traveled upon by a user can be identified at act 608. For example, routes a user has physically past can be considered not likely since there can be a relatively small percentage that the user will travel in a reverse direction. The routes can be divided into intersections at event 610, which can represent identifying a journey resolution position, the journey resolution position includes at least two results. At event 612, there can be determining likelihood of at least one of the results of the journey resolution position occurring through use of a Markov model. A check 614 can be performed to determine if a likelihood is above a threshold (e.g., automatically determined, set by a user, etc.). If the likelihood is above a threshold, then information can be disclosed to a user or an entity (e.g., user personal electronic device, host computer, etc.) at act 612. If a likelihood is not above the threshold, then the methodology 600 can return to action 602 to identify a user location.

Figure 7:
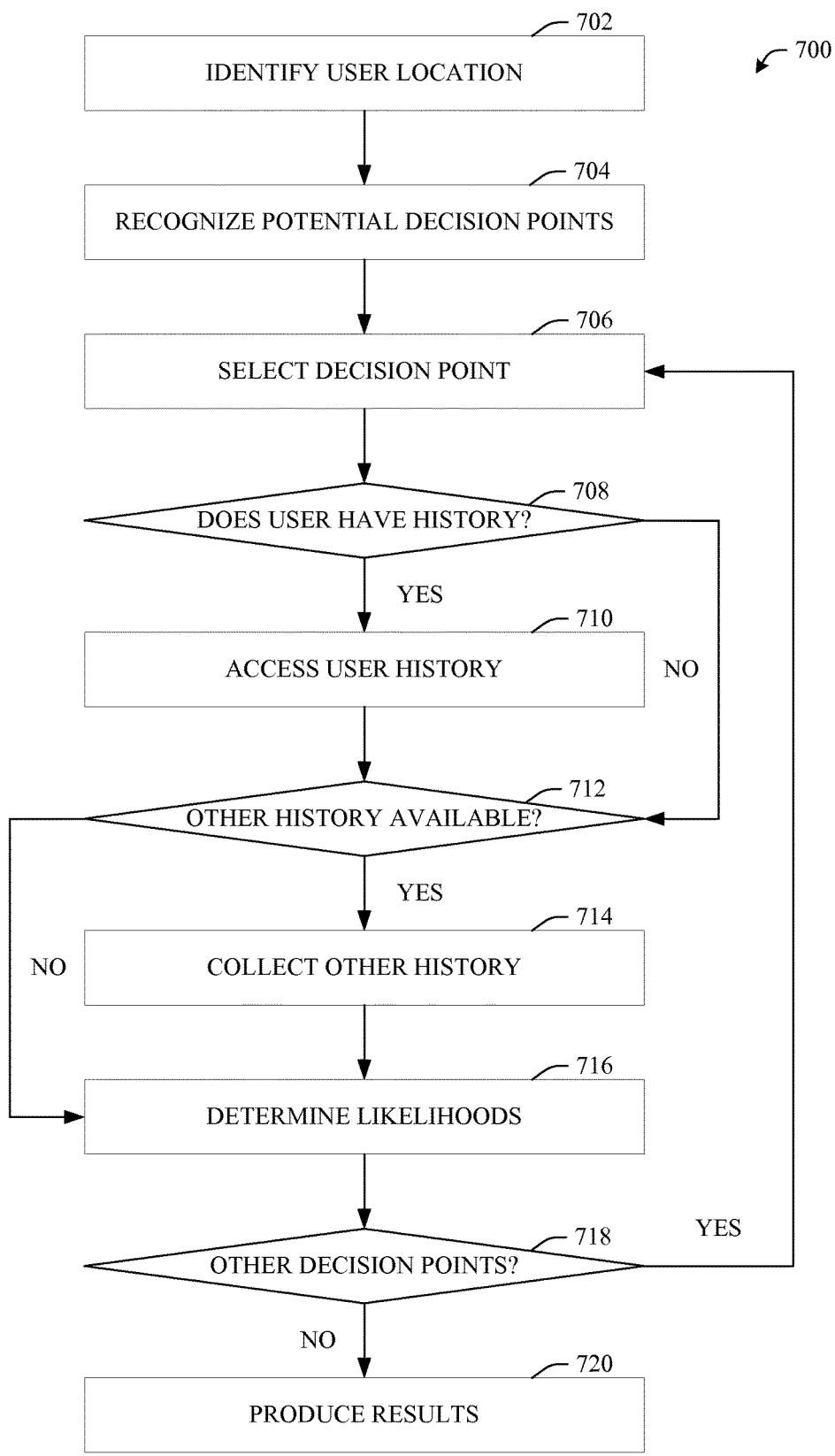
FIG. 7 illustrates a representative methodology for route decision point likelihood prediction using multiple users in accordance with an aspect of the subject specification.

Now referring to FIG. 7, an example methodology 700 is disclosed for using multiple user histories to determine likelihood of a user making a travel point decision. A user location can be identified at act 702, such as through asking a user to designate her position. Potential decision points can be recognized at action 704, which can include identifying a journey resolution position, the journey resolution position includes at least two results.

It is possible that there are multiple decision points and thus, an individual point can be selected at event 706. A check 708 can be performed to determine if there is a user history at the selected point. If there is user history, then the history can be accessed at action 710. A second check 712 can be performed independent of a result of the check 708 to determine if history of other users is available. The check can be global (e.g., any history available), specific (e.g., similar situated users—gender, age, vehicle content, and the like), etc. If content of other users is available, then the content can be accessed at act 714. Thus, history of more than one user can be taken into account when determining likelihood of an outcome for a travel decision point. While not explicitly shown, there can be an error message generated if there is no history that can be accessed, used, etc.

At action 716, there can be determining likelihood of at least one of the results of the journey resolution position occurring through use of a Markov model. A check 718 can determine if there is another individual point that should be selected and evaluated. If there is another point, then the methodology 700 can return to event 706 to select another point. If there is not another point for analysis, then results can be disclosed at act 720.

Figure 8:
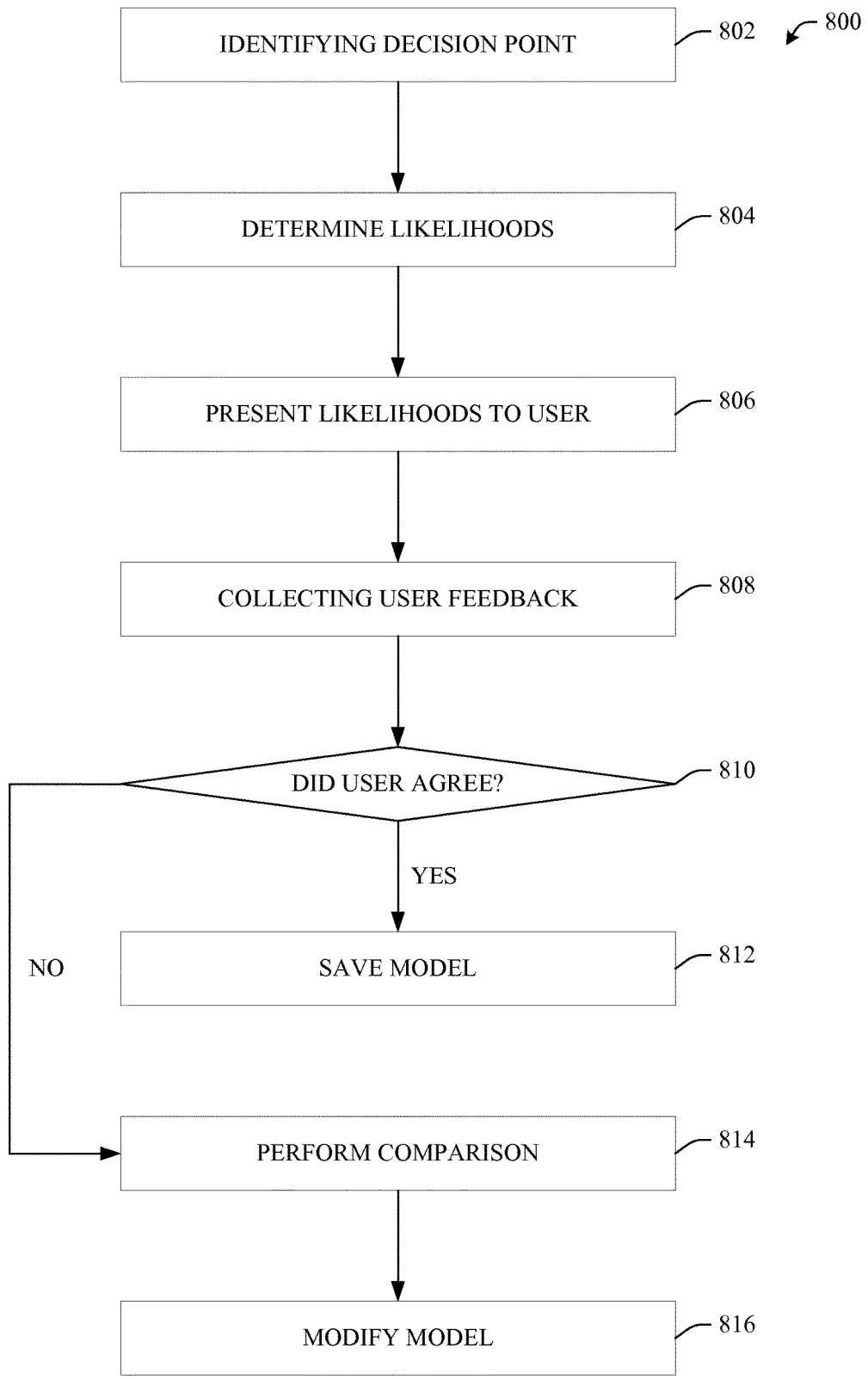
FIG. 8 illustrates a representative methodology for route decision point likelihood prediction and model training in accordance with an aspect of the subject specification.

Now referring to FIG. 8, an example methodology 800 is disclosed for training the Markov model. At action 802, a decision point can be recognized through identifying a journey resolution position, the journey resolution position includes at least two results (e.g., turning right and turning left). At act 804, there can be determining likelihood of at least one of the results of the journey resolution position occurring through use of a Markov model.

The determined likelihood can be presented to a user at event 806 (e.g., through a graphical user interface) and a user can provide feedback to the probabilities at action 808 (e.g., confirm likelihood, state likelihood is poor representation, and the like). Feedback can be gained explicitly (e.g., though asking the user), implicitly (e.g., observing user behavior), and the like. A check 810 can take place to determine if the user agreed with the likelihood. If the user agrees with the likelihood, then the model can be retained at act 812. In addition, the model can be considered more accurate, and thus it can become more difficult to modify the model. However, if the user does not agree with the model, then a comparison can be made between the estimate and how the user responded at event 814. Based upon an outcome of the comparison, the model can modified at action 816. According to one embodiment, a determination can be made based on the comparison if the difference is enough to warrant a modification of the model.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 9:
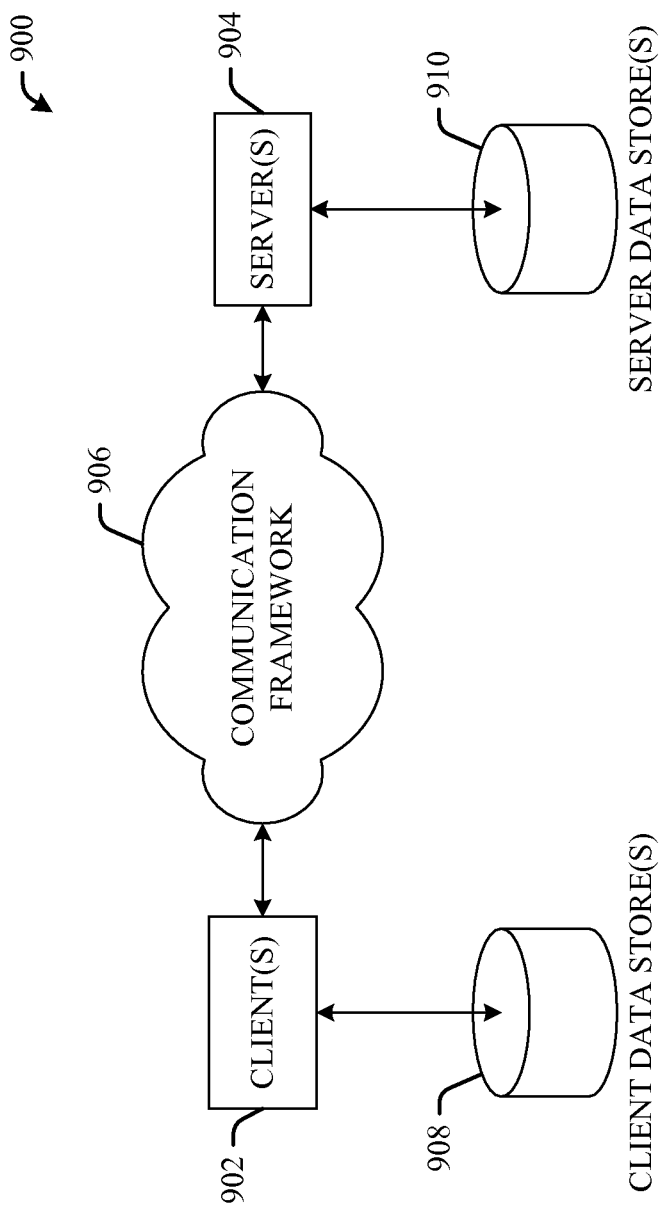
FIG. 9 illustrates an example of a schematic block diagram of a computing environment in accordance with an aspect subject specification.
Figure 10:
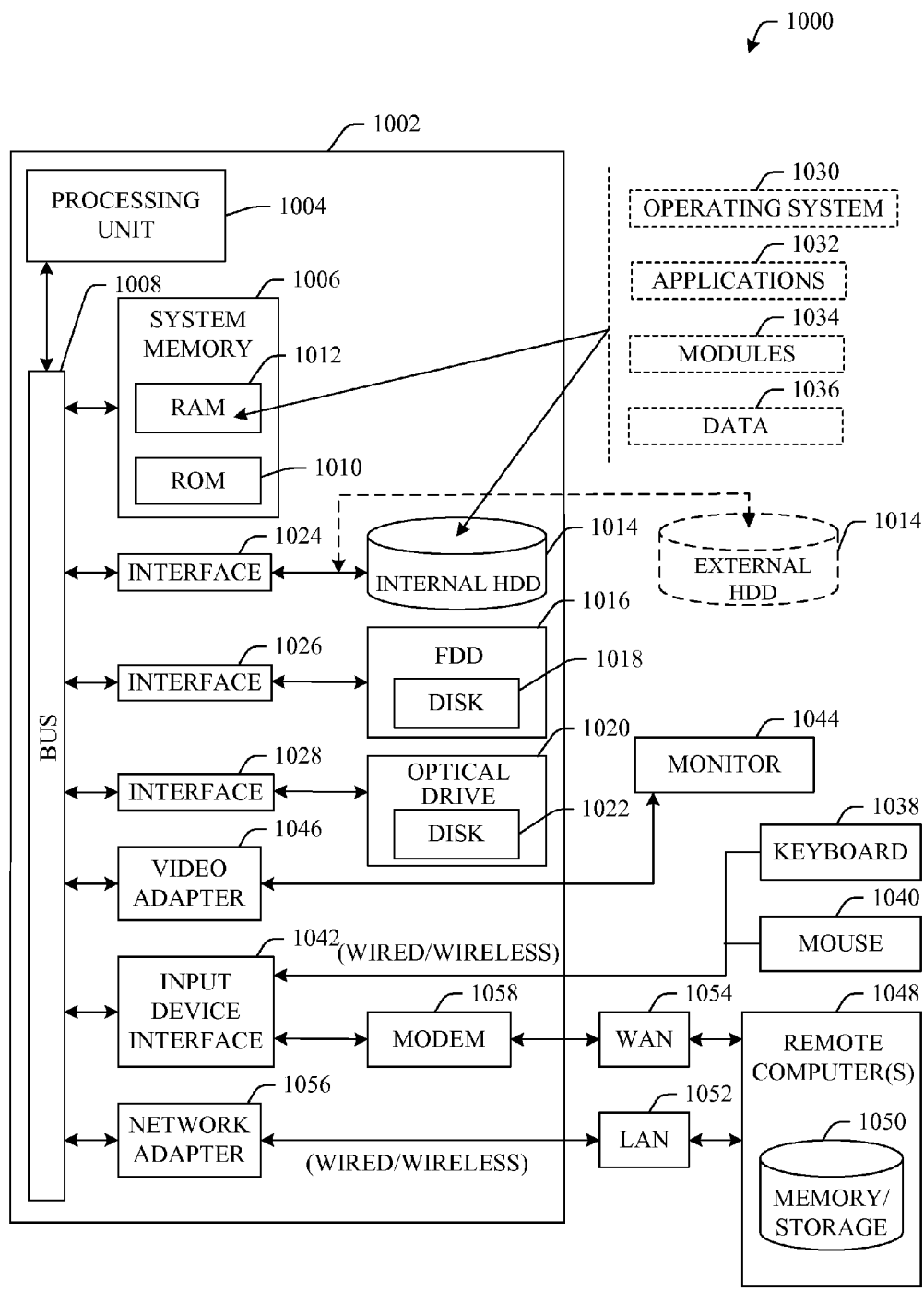
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   one or more processors; and
   memory storing one or more components that are executable by the one or more processors, the one or more components comprising:
   a communication component to obtain global positioning data of an entity;
   an observation component to track a journey of the entity;
   a recognition component to identify a potential travel space of the entity such that the potential travel space is identified by determining a set radius from a location of the entity or a number of intersections around a location of the entity, the potential travel space including potential travel paths;
   a partition component to divide the potential travel paths into a set of future segments defined by at least one travel decision point within the potential travel space;
   an analysis component to evaluate travel history of the entity, wherein the travel history of the entity is determined at least partially based on the global positioning data obtained by the communication component; and
   a calculation component to:
   define a particular number of most recently traveled segments used to compute a route likelihood over the set of future segments, wherein an individual segment is defined by two travel decision points and wherein the most recently traveled segments are obtained through at least one of the communication component or the observation component;
   determine, based at least in part on the travel history of the entity, a direction of travel of the entity based at least in part on observing the particular number of most recently traveled segments traveled by the entity during a current journey using the observation component; and
   compute the route likelihood of the entity over the set of future segments based at least in part on the direction of travel by computing a probability that the entity will select different outcomes of the at least one travel decision point.

2. The system of claim 1, wherein the entity is a user, a user classification, a vehicle, or a combination thereof.

3. The system of claim 1, further comprising a designation component to identify a highest probability outcome of the at least one travel decision point.

4. The system of claim 3, further comprising a creation component to produce an estimated route based upon the highest probability outcome of the at least one travel decision point.

5. The system of claim 4, wherein the creation component is further configured to produce the estimated route based upon the highest probability outcome of the at least one travel decision point and at least one contextual circumstance.

6. The system of claim 1, wherein the potential travel space includes at least two travel decision points that do not define a same segment, and wherein a first probability the entity selects different outcomes of a first travel decision point of the at least two travel decision points is independent of a second probability the entity selects different outcomes of a second travel decision point of the at least two travel decision points.

7. The system of claim 1, wherein the calculation component is further configured to use a Markov model to compute the route likelihood of the entity over the set of future segments.

8. A method, comprising:
obtaining global positioning data of an entity;
tracking a journey of the entity;
identifying a potential travel space of the entity such that the potential travel space is identified by determining a set radius from a location of the entity or a number of intersections around a location of the entity, wherein the potential travel space includes potential travel paths;
dividing the potential travel paths into a set of future segments defined by at least one travel decision point within the potential travel space;
determining a particular number of most recently traveled segments most recently traveled by the entity based on at least one of the obtained global positioning data or the tracked journey of the entity, the determined particular number of most recently traveled segments being used to compute a route likelihood over the set of future segments, wherein an individual segment is defined by two travel decision points;
evaluating, using one or more processors, travel history of the entity based on at least in part on the tracked journey;
determining, using at least one of the one or more processors and based at least in part on the travel history of the entity, a direction of travel of the entity based at least in part on observing the particular number of most recently traveled segments traveled by the entity during a current journey using at least in part the tracked journey of the entity; and
computing, using at least one of the one or more processors, the route likelihood of the entity over the set of future segments based at least in part on the direction of travel by computing a probability that the entity will select different outcomes of the at least one travel decision point.

9. The method of claim 8, further comprising using a Markov model to compute the route likelihood of the entity over the set of future segments.

10. The method of claim 8, wherein the potential travel space includes at least two travel decision points that do not define a same segment, and wherein a first probability the entity takes different outcomes of a first travel decision point of the at least two travel decision points is independent of a second probability the entity takes different outcomes of a second travel decision point of the at least two travel decision points.

11. A method, comprising:
obtaining global positioning data of an entity;
tracking a journey of the entity;
identifying a potential travel space of the entity such that the potential travel space is identified by determining a set radius from a location of the entity or a number of intersections around a location of the entity, wherein the potential travel space includes potential travel paths;
dividing the potential travel paths into a set of future segments defined by at least one travel decision point within the potential travel space;
determining a particular number of most recently traveled segments by the entity based on the global positioning data, the determined particular number of most recently traveled segments being used to compute a route likelihood, wherein an individual segment is defined by two travel decision points;
evaluating, using one or more processors, travel history of the entity based on at least partially on the tracked journey;
determining, using at least one of the one or more processors and based at least in part on the travel history of the entity, a direction of travel of the entity based at least in part on observing the particular number of most recently traveled segments traveled by the entity during a current journey;
computing, using at least one of the one or more processors, the route likelihood of the entity as a probability the entity will travel different segments among the set of future segments from at least one travel decision point, wherein the set of future segments is determined based at least in part on the direction of travel; and
identifying a highest probability outcome of the at least one travel decision point.

12. The method of claim 11, further comprising producing an estimated route based upon the highest probability outcome of the at least one travel decision point.

13. The method of claim 11, further comprising:
determining that a probability of the highest probability outcome meets or exceeds a threshold probability; and
at least partly in response to the determining, causing anticipatory information associated with the highest probability outcome to be output, the anticipatory information warning the entity of a road situation.

14. The method of claim 11, further comprising:
determining that a probability of the highest probability outcome meets or exceeds a threshold probability; and
at least partly in response to the determining, automatically adapting a vehicle to an expected operating condition without user intervention.

15. The method of claim 8, further comprising:
producing an estimated route based upon the computed route likelihood of the entity over the set of future segments;
determining that a probability of the entity traveling the estimated route meets or exceeds a threshold probability; and
at least partly in response to the determining, automatically adapting a vehicle to an expected operating condition without user intervention.

16. The method of claim 15, wherein automatically adapting the vehicle comprises at least one of:
engaging a turn signal for the vehicle;
pointing headlights of the vehicle;
darkening a windshield of the vehicle;
deactivating a cylinder of an engine of the vehicle; or
pre-braking the vehicle.

* * * * *